US007558577B2

(12) United States Patent
Dillon et al.

(10) Patent No.: US 7,558,577 B2
(45) Date of Patent: Jul. 7, 2009

(54) METHODS FOR DIVIDING BASE STATION RESOURCES

(75) Inventors: Matt J. Dillon, Hawthorn Woods, IL (US); John M. Harris, Chicago, IL (US); Vijay Subramanian, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 375 days.

(21) Appl. No.: 11/271,069

(22) Filed: Nov. 10, 2005

(65) Prior Publication Data

US 2007/0105559 A1 May 10, 2007

(51) Int. Cl.
*H04W 36/00* (2006.01)
*H04W 72/00* (2006.01)
(52) U.S. Cl. ...................... 455/443; 455/450
(58) Field of Classification Search ............... 455/450, 455/452.1, 452.2, 502, 446–449, 426.1, 422.1, 455/465, 442
See application file for complete search history.

(56) References Cited

U.S. PATENT DOCUMENTS

| | | | | |
|---|---|---|---|---|
| 6,026,082 | A * | 2/2000 | Astrin | 370/336 |
| 6,154,654 | A * | 11/2000 | Mao | 455/446 |
| 6,522,885 | B1 * | 2/2003 | Tang et al. | 455/447 |
| 7,006,823 | B2 * | 2/2006 | Shurvinton et al. | 455/422.1 |
| 2002/0082032 | A1 | 6/2002 | Hunziner | |
| 2003/0054730 | A1 | 3/2003 | Chen et al. | |
| 2004/0095907 | A1 | 5/2004 | Agee et al. | |
| 2005/0113093 | A1 | 5/2005 | Mohebbi | |
| 2005/0129058 | A1 * | 6/2005 | Casaccia et al. | 370/464 |
| 2006/0188031 | A1 * | 8/2006 | Liu | 375/260 |

FOREIGN PATENT DOCUMENTS

WO WO 02/23758 A1 3/2002
WO WO 2004/100566 A2 11/2004

OTHER PUBLICATIONS

RCR STD—28, Personal Hardy Phone System, ARIB Standard, version 4.0(1/2), Association of Radio Industries and businesses (ARIB, p. 26.
Draft IEEE Standard for Local and metropolitan area networks, PART 16: Air Interface For Fixed And Mobile Broadband Wireless Access Systems, Amendment For Physical And Medium Access Control Layers For Combined Fixed And Mobile Operations In Licensed Bands, IEEE P802 16e/D5, Sep. 18, 2004, LAN MAN Standards Committee of the IEEE Computer Society and the IEEE Microwave Theory and Techniques Society, p. 132.
3GPP TSG RAN WG1 #42, Interference Coordination for Evolved UTRA Uplink Access, R1-05-0695, Alcatel, London, Great Britain, Aug. 29-Sep. 2, 2005, pp. 1-7.
IEEE 802.20 Working Group on Mobile Broadband Wireless Access, Technology Overview, IEEE C802.20-05/72, Oct. 28, 2005, pages all.

* cited by examiner

*Primary Examiner*—Melody Mehrpour

(57) ABSTRACT

Methods for dividing resources of base stations among multiple mobile stations are provided. According to one embodiment of the invention, an overlapping group having a plurality of mobile stations that are overlapped between at least two cellular areas are generated (310) to provide a plurality of overlapping mobile stations, which are ranked (320) based, at least in part, on at least one threshold. A maximum number of the plurality of overlapping mobile stations having a highest ranking that can be assigned with reserved frequency and timing assignments are selected (322) to provide a plurality of selected overlapping mobile stations. These selected overlapping mobile stations are assigned (324) using the reserved frequency and timing assignments.

6 Claims, 4 Drawing Sheets

METHODS FOR DIVIDING BASE STATION RESOURCES

TECHNICAL FIELD

This invention relates generally to a technique for dividing base station resources among multiple mobile stations.

BACKGROUND

With the deployment of Orthogonal Frequency Division Multiple Access ("OFDM") communication technologies, such as 802.16E, current sub channel assignment reservations and reuse planning tend to be complex and artificially restrictive, which frequently leads to unnecessary loss of substantial throughput capabilities of the system. For example, merely optimizing per sub channel carrier to interference ratio ("C/I") per user (e.g., fair user weighting) or per call cell scheduling is not necessarily efficient. In particular, this selection of frequency based on best-received signal strength to listener (e.g., leveraging constructive multipath) does not take into account when multiple frequencies will yield roughly the same signal strength for the listener. On the other hand, specific frequencies may yield a significantly different amount of interference to other users listening during the same slot. For example, the current system is typically set up so that only one user within that sector will be receiving on a particular frequency, but the neighboring sectors may be using the same frequency such that the neighboring sectors' assignment may have an impact on the interference experienced by the user within its sector.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
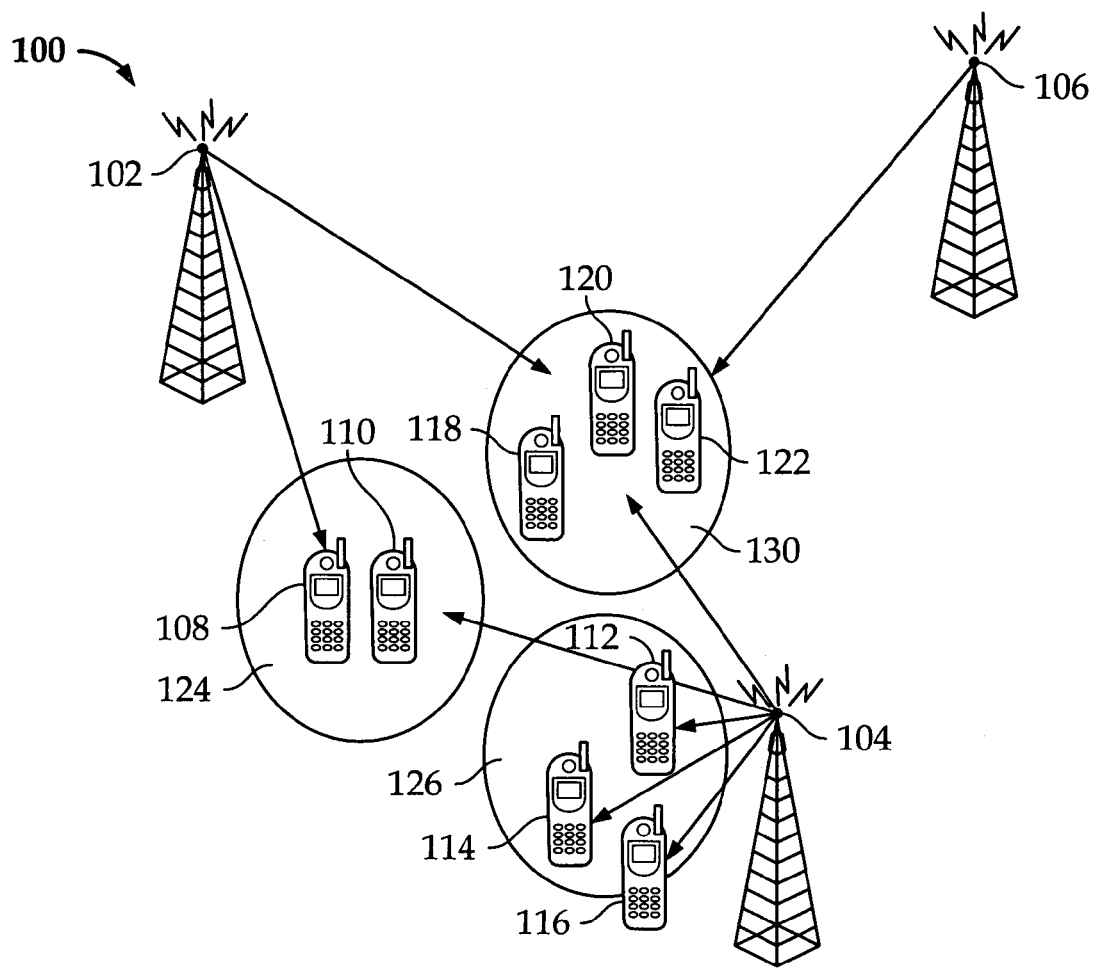
FIG. 1 comprises a block diagram of a typical wireless communication system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, an overlapping group having a plurality of mobile stations that are overlapped between at least two cellular areas are generated to provide a plurality of overlapping mobile stations, which are ranked based, at least in part, on at least one threshold. A maximum number of the plurality of overlapping mobile stations having a highest ranking that can be assigned with reserved frequency and timing assignments are selected to provide a plurality of selected overlapping mobile stations. These selected overlapping mobile stations are assigned using the reserved frequency and timing assignments. With various embodiments, the threshold is based, at least in part, on power levels of the overlapping mobile stations, type of service needed by the overlapping mobile stations, and aggregated data rates of the mobile stations.

In one embodiment, the remaining overlapping mobile stations that were not the selected overlapping mobile stations are assigned using the non-reserved frequency and timing. For an embodiment, a non-overlapping group having a plurality of mobile stations that are in a single cellular area is generated to provide a plurality of non-overlapping mobile stations, which are assigned using non-reserved frequency and timing assignments. In one specific embodiment, prior to when the overlapping group is generated, measurement reports from the plurality of mobile stations are received.

According to various embodiments, it is determined whether a mobile station is in a single cellular area, and if not, another determination is made as to whether there is a variance relative to a serving base station having a weakest signal strength. When there is such a variance, measurement reports of one or more serving base stations and neighboring base stations are sent. In one specific embodiment, when the mobile station is in the single cellular area and/or there is no such variance, only a measurement report of one or more serving base stations will be sent. For another embodiment, prior to the determination of the variance, a predefined number of serving base stations having a highest power level relative to a closest serving base station is selected to provide a plurality of selected serving base stations. A signal strength of at least one of these selected serving base stations is measured to detect a variance relative to a serving base station having a weakest signal strength.

In various embodiments, a comparison between the cellular condition information of a serving base station and one or more neighboring base stations is obtained to determine whether the serving base station is a worst base station based, at least in part, on a predefined criterion. If the serving base station is, in fact, the worst base station, reserved frequency and timing assignments are adjusted to provide new reserved frequency and timing assignments. In specific embodiments, this predefined criterion may include a highest number of mobile stations that are not meeting quality targets, a highest total cellular throughput, and/or a highest reverse power increase. For one embodiment, one or more neighboring base stations will be informed of the new reserved frequency and timing assignments.

According to another embodiment, obtaining a comparison includes a receipt of cellular condition information from at least one neighboring base station, followed by a determination as to whether the cellular condition exceeds a quality threshold. If the quality threshold has, in fact, been exceeded, the cellular condition information of the at least one neighboring base station is compared with a current cellular condition information of the serving base station to provide the comparison when the cellular condition exceeds the quality threshold. For another embodiment, the comparison is obtained by assessing current cellular condition information of the serving base station based, at least in part, on a predefined duration of time.

In one particular embodiment, the adjustment of the reserved frequency and timing assignments further comprises a determination made as to whether the assignments of the reserved frequency and timing of overlapping mobile stations have exceeded a predefined assignment of the reserved frequency and timing. If this is the case, the reserved frequency and timing assignments are increased by a predefined number. Otherwise, when the assignments of the reserved frequency and timing of overlapping mobile stations have not exceeded the predefined assignment of the reserved frequency and timing, the reserved frequency and timing assignments are reduced by a predetermined value. The new reserved frequency and timing assignments are then sent to one or more neighboring base stations, specifically in one embodiment.

Through the various embodiments, an improved technique for dividing resources of base stations among multiple mobile stations has been provided that, among other things, detects measurement reports based on the serving base station and the neighboring base station. As a result, the resources, such as the frequency and timing, are divided with a more holistic view of the usage of these resources. The various teachings are able to choose users with an assignment during a timeslot that ultimately will receive the least interference from the frequencies being transmitted to other users during the timeslot. Thus, a more intelligent frequency and timing assignment technique is provided that maximizes signal strength received while minimizing the interference at other currently receiving mobile stations. In other words, these frequency and interference assignments are divided among the mobile stations based not only on the unique radio frequency conditions of the receivers but also the radio frequency conditions of the interference receivers.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Referring now to the drawings, and in particular to FIG. 1, for purposes of providing an illustrative but non-exhaustive example to facilitate this description, a specific operational paradigm using a wireless communication system is shown and indicated generally at numeral reference 100. Those skilled in the art, however, will recognize and appreciate that the specifics of this illustrative example are not specific to the invention itself and that the teachings set forth herein are applicable in a variety of alternative settings. For example, since the teachings described are not platform dependent, they can be applied to various systems, such as, but not limited to, Code Division Multiple Access (CDMA) systems, Time Division Multiple Access (TDMA) systems, Universal Mobile Telecommunications Systems ("UMTSs"), and General Packet Radio Service ("GPRS") systems. In fact, any communication network that transmits data packets is contemplated, and these various embodiments are within the scope of the invention.

Referring now to the exemplary communication network shown in FIG. 1, three base stations 102, 104, and 106 provide services to multiple cellular mobile stations 108, 110, 112, 114, 116, 118, 120, 122. Specifically, the first base station 102 serves mobile station 108, which belongs to a first cellular area 124, while in this same area, mobile station 110 is served by the second base station 104. In a second cellular area 126, mobile stations 112, 114, 116 are also served by the second base station 104. The remaining mobile stations 118, 120, 122 belonging to a third cellular area 130 are served by the first, second, and third base stations 102, 104, 106, respectively. As shown, mobile stations 112, 114, 116 are served by a single serving base station, which will be considered as a non-overlapping mobile station since it is served by a single serving base station. In contrast, the rest of the mobile stations 108, 110, 118, 120, 122 are overlapped mobile stations since, as shown, they can be served by at least two base stations. In this example shown, mobile stations 108, 110 are overlapping mobile stations served by both the first and second base stations 102, 104. Similarly, mobile stations 118, 120, 122 are also overlapping mobile stations served by all the base stations, specifically the first, second, and third base stations 102, 104, 106.

For clarity, serving base stations of a mobile station are, as well known in the art, base stations that are providing the mobile station with the necessary frequency and timing (i.e., resources) to effectuate the communications of the mobile station. In contrast, neighboring base stations are base stations that are not serving the mobile station, but are in close proximity to potentially serve this mobile station as it moves. As such, as shown in FIG. 1, mobile stations 108 includes two serving base stations 102 and 104, while base station 106 is consider a neighboring base station.

Through the various embodiments, the overlapping mobile stations are ranked and assigned using reserved frequency and timing. In this way, cellular areas that overlap can mutually avoid frequencies of high power users. Note that there is even greater flexibility for symbol overlap. Since the channels have lower interference, higher modulation makes up for the loss of using all frequencies. This will affect both downlink and uplink interference levels. Cellular condition information of the mobile station, which includes the C/I information, the overlap, and/or the power level information, is used to determine the prioritized sub channel assignment and symbol placement, thereby increasing the inter-sector reserved resources (e.g., orthogonality). As a result, an additional criterion of adjacent site or sector usage of these frequencies is provided to produce more efficient assignment of the resources.

Furthermore, the mobility of the mobile stations can easily be detected since the neighboring base station signal strengths are also being considered. The mobility of the mobile stations can be an important factor for efficient division of the resources of the base stations. For example, a mobile station that is immediately next to the serving base station would not be affected by a neighboring base station's use of the same frequency as the serving base station. In contrast, with the mobile stations being on the edge of the serving base station, it is important for the neighboring base station not to be using the same frequency, especially if a target mobile station is also on the edge of that sector. As such, multiple implementations are preferable depending upon the configuration of the communications system. These various implementations, which may not be specifically shown, are contemplated and within the scope of the various teachings described.

According to one embodiment, smart antennas are also preferred because users can be easily grouped when they are in a similar location and/or require the same smart antenna setting during a particular time interval. With this, the inability of the system to easily transmit to different tones using different smart antenna settings simultaneously (e.g., during the exact same time interval) can be avoided. This generally feeds into the concept of creating groups of frequencies within the sector such that a specific grouping will tend to be used for users near the base station during one time interval while in the neighboring sector, a same grouping of frequencies will be used by the base station for users at the edge of the sector. The use of smart antennas also feeds into the concept of creating groups of users such that during a first time interval, the serving base station will transmit to the users that require one smart antenna setting, and then during the next subsequent time interval, the serving base station will transmit to the other group of users using a different smart antenna setting. These issues can be accommodated based on a pre-arranged policy between base stations.

Figure 2:
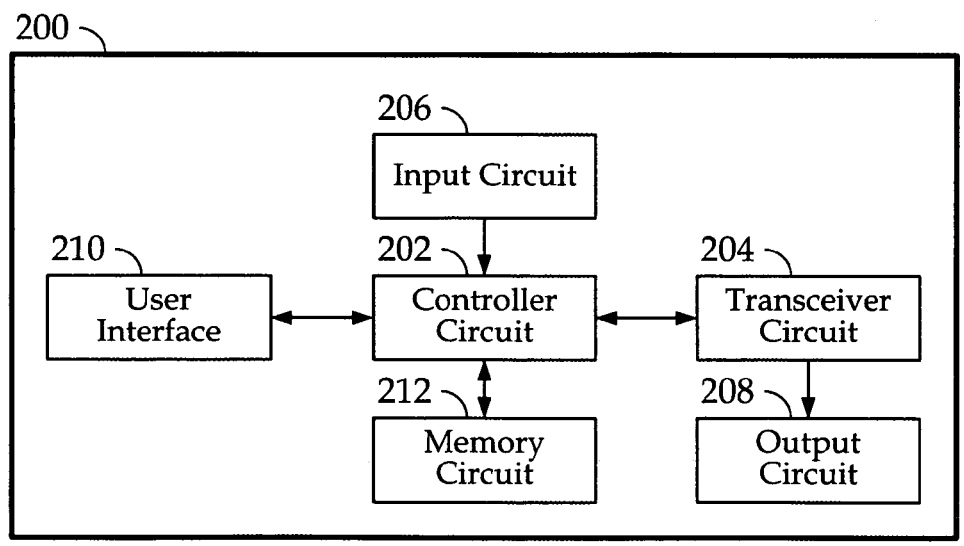
FIG. 2 comprises a block diagram of a mobile station suitable for various embodiments of the invention.

Referring to FIG. 2, a MS 200 suitable for various embodiments is shown. For simplicity and clarity, it should be noted that FIG. 2 does not include all the hardware components needed in a typical MS, which are commonly included and known in the art. Moreover, as a skilled artisan readily appreciates, other hardware configurations and circuitry topology layouts, although not shown, can be used to implement the various teachings described. As such, the MS 200 shown in FIG. 2 is provided as a practical example to implement the teachings of the various embodiments. Moreover, "circuit" refers to one or more component devices such as, but not limited to, processors, memory devices, application specific integrated circuits (ASICs), and/or firmware, which are created to implement or adapted to implement (perhaps through the use of software) certain functionality, all within the scope of the various teachings described.

the exemplary MS shown, a controller circuit 202 is included to send out necessary measurement reports to the mobile station's serving base station(s). The measurement reports include information about both the mobile station's serving base station(s) and neighboring base station(s). In particular, according to one embodiment, when the mobile station has overlapping serving base stations, signal strengths of the strongest base stations are measured in order to detect whether there is a variance relative to a serving base station having a weakest signal strength. If this is the case, measurement reports of both the serving base stations and the neighboring base stations are sent via a transceiver circuit 204.

The various embodiments also contemplate another implementation where a new message is created to enable the mobile station to efficiently report on the signal strength of neighboring base stations for frequencies that are the strongest from the mobile station's strongest signal strength serving base station. This is especially desirable when there are multiple frequencies with approximately the same signal strength from the mobile station's strongest base station while the neighboring base station signal strengths vary significantly. It is also particularly important to report on neighboring base station signal strengths on these frequencies when they have approximately the same signal strength for the best serving base station, but some of these frequencies have much higher signal strength from neighboring towers than others. In one specific embodiment, the mobile station is adapted to report the signal strength of the neighboring base station if these conditions are detected through, for example, the use of thresholds.

As typically provided in a mobile station, an input circuit 206, such as a recorder, is included to provide input data. An output circuit 208, such as an antenna, is included to provide data transmission to the infrastructure, such as the base stations. A user interface 210 is also included to obtain user inputs, and a memory circuit 212 is used to provide memory to either temporarily or permanently store information.

Figure 3:
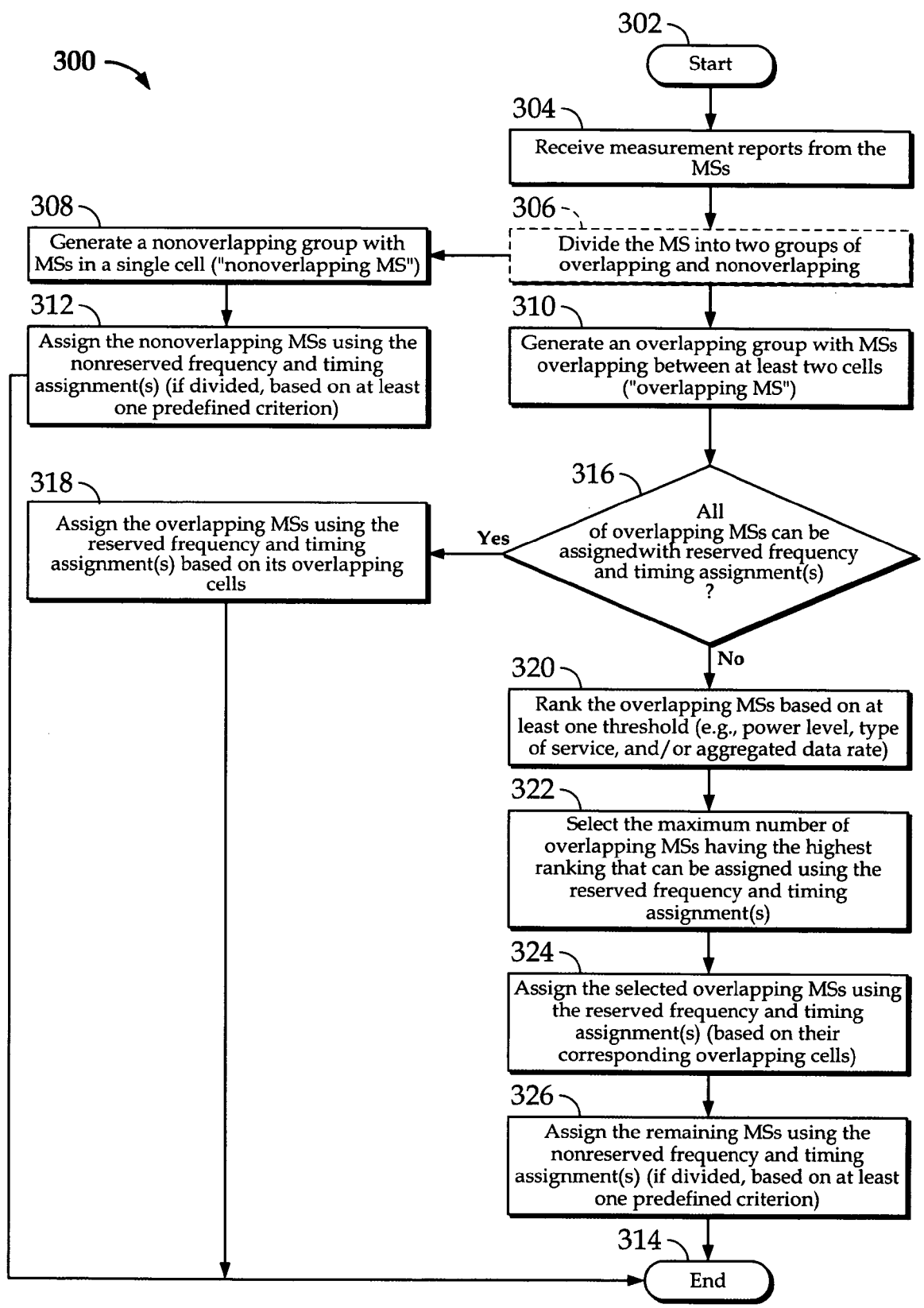
FIG. 3 comprises a flow chart diagram of an assignment process implemented at a base station according to an embodiment of the invention.

Turning now to FIG. 3, a flow chart diagram of an assignment process implemented at a base station according to an embodiment is shown and indicated generally at numeral reference 300. Although the process shown is preferably implemented at the base station, there may be other implementations of each of the processes shown that are better for other components in the infrastructure in the communication system. These processes shown, thus, can be implemented fully or partially at any of the components within the system. Moreover, as one skilled in the art can readily appreciate, any of the processes shown can be altered in multiple ways to achieve the same functions and results of the various teachings described. As a result, the processes shown are one exemplary embodiment of multiple variation embodiments that may not be specifically shown. Thus, the processes shown are directed to the system, and each of them may be altered slightly to accommodate any of the components in the communications system. These other embodiments, however, are within the scope of the various teachings described.

In light of this, this particular assignment process 300 starts by receiving 304 multiple measurement reports from a plurality of mobile stations. Based on these measurement reports, the mobile stations are optionally divided 306 into two groups, specifically a non-overlapping group having mobile stations that are in a cellular area with a single serving base station and an overlapping group having mobile stations that are in the cellular area with more than one serving base station. In particular, according to this embodiment, a non-overlapping group and an overlapping group are generated 308, 310. For the non-overlapping group, these non-overlapping mobile stations are assigned 312 using the non-reserved frequency and timing assignments. In one embodiment, these non-reserved frequency and timing assignments can be further divided. In that case, these assignments can be allocated using at least one predefined criterion. For this part of the subroutine of non-overlapping mobile stations, the process ends 314 once these non-overlapping mobile stations are allocated with the non-reserved frequency and timing assignments.

For the overlapping mobile stations, it is determined 316 whether all of the overlapping mobile stations can be assigned using reserved frequency and timing assignments. In other words, it is determined whether there are enough reserved frequency and timing assignments to accommodate all of the overlapping mobile stations. If so, the reserved frequency and timing assignments are accordingly assigned 318 to all of the overlapping mobile stations, which ends 314 the overlapping subroutine of the process at this point.

If, however, not all of the overlapping mobile stations can be assigned using the reserved frequency and timing assignments, the overlapping mobile stations are ranked 320 based on at least one threshold, such as power level, type of service, and/or aggregated data rate. Using these ranked overlapping mobile stations, a maximum number of overlapping mobile stations having a highest ranking that can be assigned with the reserved resources are selected 322 and assigned 324 using the frequency and timing assignments. In one specific embodiment, these assignments are based on the mobile station's corresponding overlapping cellular area. The remaining overlapping mobile stations that were not assigned with the reserved frequency and timing are then assigned 326 using non-reserved frequency and timing assignments. In a particular embodiment, if the non-reserved frequency and timing assignments are divided, the remaining overlapping mobile stations are assigned based on at least one predefined criterion, which ends 314 the process at this point.

Figure 4:
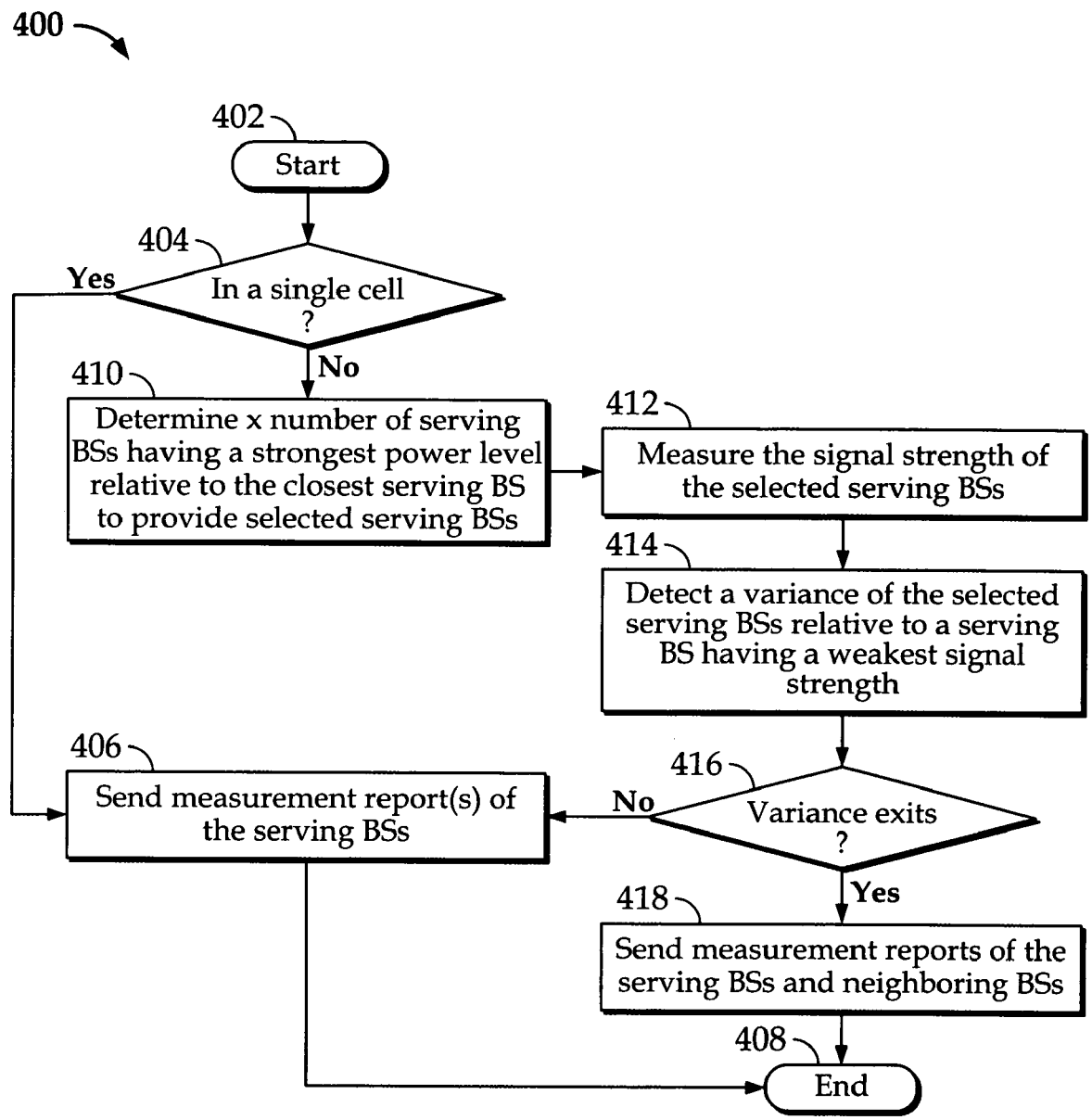
FIG. 4 comprises a flow chart diagram of a reporting process implemented at a mobile station according to an embodiment of the invention.

Referring now to FIG. 4, a flow chart diagram of a reporting process implemented at a mobile station according to one embodiment is shown and indicated generally at numeral reference 400. This reporting process 400, as shown, starts 402 with a determination 404 as to whether the mobile station is in a single cellular area and can be served by a single base station (e.g., a non-overlapping mobile station). If the mobile station is in a non-overlapping mobile station, a measurement report of only the serving base station is sent 406, which ends 408 the reporting process 400 at this point. If, on the other hand, the mobile station is an overlapping mobile station, a predefined number of serving base station having the strongest power level relative to the closest serving base station is determined 410 to provide at least one selected serving base station. The signal strength of the selected serving base stations is measured 412 for detecting 414 a variance between the selected serving base stations relative to a serving base station having the weakest signal strength. Of course, in another embodiment, the variance can also be based on a base station having the strongest signal strength rather than the weakest signal, depending upon the configuration of the communications system. The reporting process 400 continues by determining 416 whether such a variance does, in fact, exist. Measurement reports of the serving base stations and the neighboring base stations are sent 418 when there is a variance. Otherwise, only the measurement reports of serving base stations are sent 406, which brings the reporting process to a completion 408.

Figure 5:
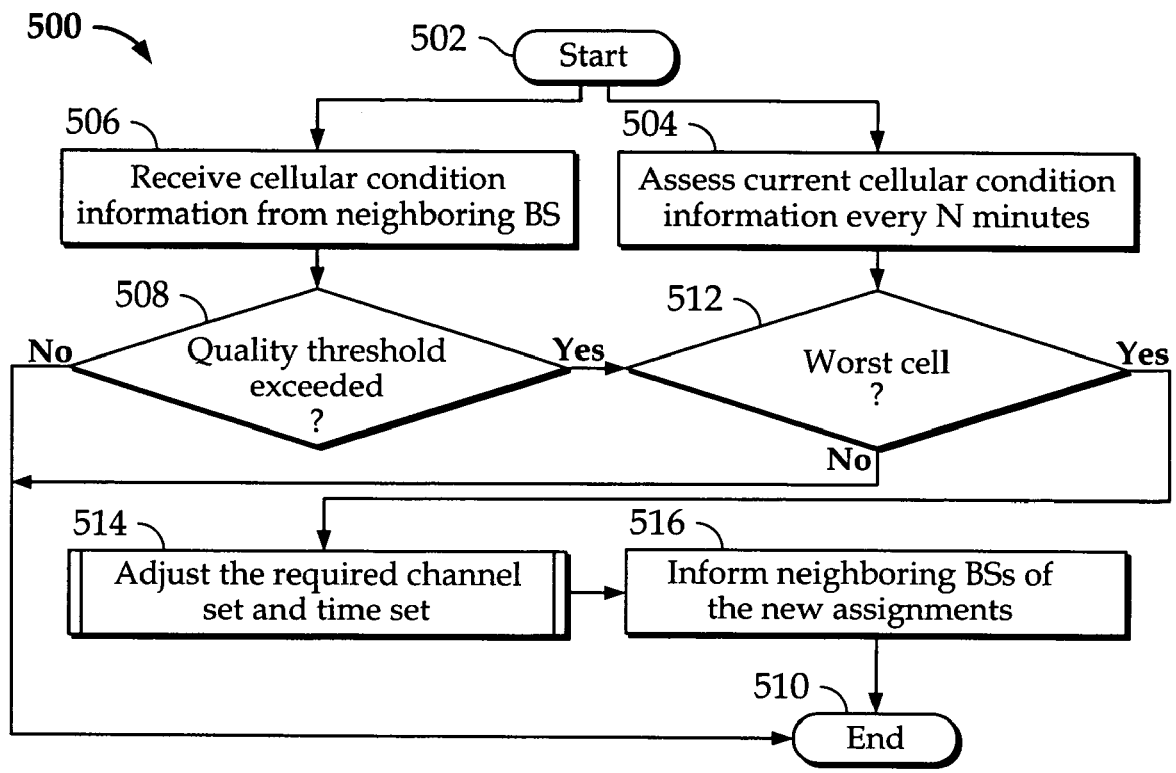
FIG. 5 comprises a flow chart diagram of an adjustment process implemented at a base station according to an embodiment of the invention.

Turning now to FIG. 5, a flow chart diagram of an adjustment process implemented at a base station according to an embodiment is shown and indicated generally at numeral reference 500. The adjustment process 500 is initiated 502 one of two ways according to this embodiment. The process 500 can be initiated by setting a timer count to access 504 the current cellular condition of the base station after a predefined duration of time, such as N seconds and/or minutes. The other method is to start the process 500 when the cellular condition information of a neighboring base station is received 506. These two methods to initiate the process 500 are preferably not mutually exclusive. The purpose is to check periodically whether the amount of available reserved frequency and timing should be adjusted.

As illustrated in the embodiment shown in FIG. 5, an optional determination 508 is included to check whether a quality threshold has been exceeded from a comparison of the current cellular condition of the base station and the neighboring base station. In the case where the quality threshold is not exceeded, the process ends 510. This quality threshold is used to minimize the need to check the cellular condition information from the neighboring base station every time. Rather, the quality threshold will ensure that only more relevant cellular condition information of the neighboring base station will be considered for adjustments.

If, on the other hand, the quality threshold has been exceeded and/or the time duration had passed, it is next determined 512 whether this base station is the worst cell based on a predefined criterion, such as the highest number of users not meeting quality targets (e.g., erasure rate, throughput, delay, and/or delay variance jitter), highest total cellular throughput, and/or highest reverse cellular rise of RX power increased from nominal. If the base station is not the worst cell, no adjustment needs to be made and the process ends 510. If, however, the base station is the worst cell, the required channel set and time set are accordingly adjusted, which is specifically shown according to one embodiment in FIG. 6. The neighboring base stations are informed 516 of these new adjusted assignments and the process is completed 510.

Figure 6:
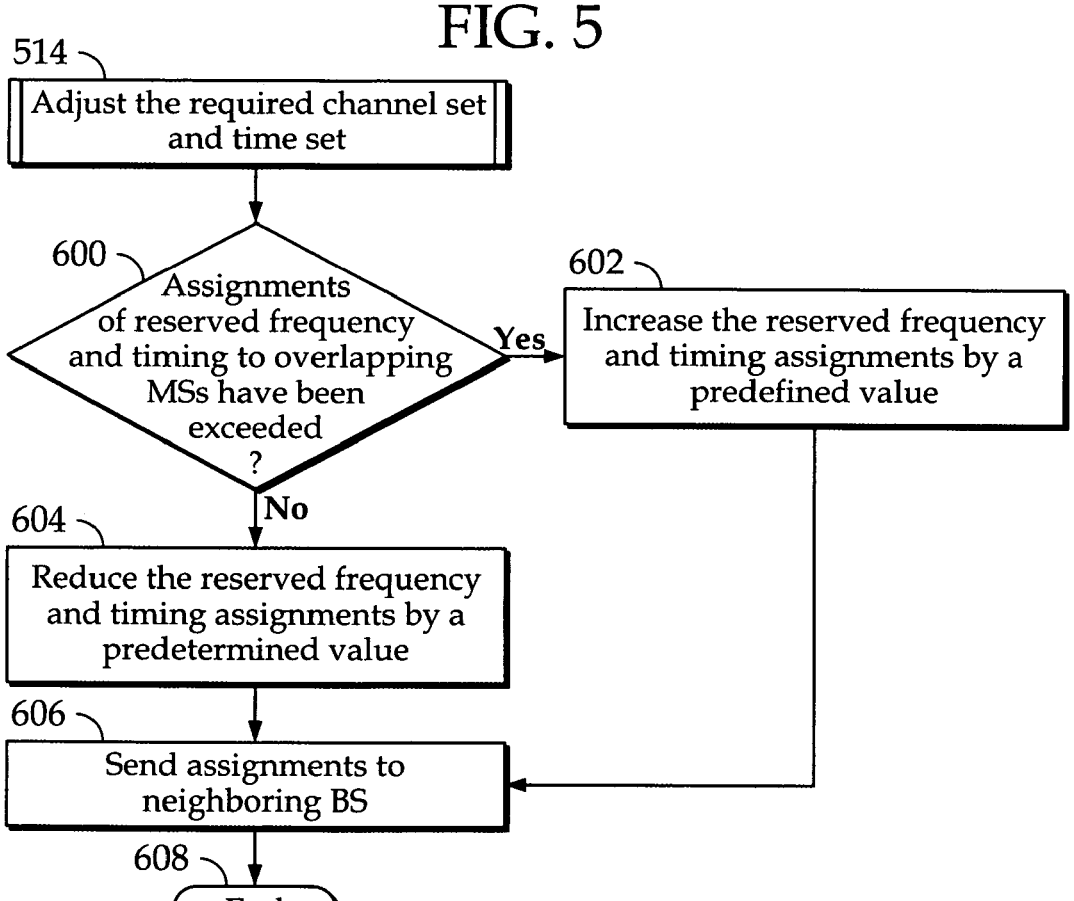
FIG. 6 comprises a flow chart diagram of a subroutine process from FIG. 5 according to an embodiment of the invention.

Referring now to FIG. 6, a flow chart diagram of a subroutine process 514 from FIG. 5 according to an embodiment is shown. According to this embodiment shown in FIG. 6, the adjustment subroutine process 514 first determines 600 whether assignments of reserved frequency and timing assignments to overlapping mobile stations have already been exceeded. If the allocation of these assignments has been exceeded, the reserved frequency and timing assignments are increased 602 by a predefined value. If, however, the allocation of these assignments has not been exceeded, the reserved frequency and timing assignments are, in contrast, decreased 604 by a predefined value. These new adjusted assignments are then sent 606 to the neighboring base stations, which completes 608 the subroutine process 514.

Through the various embodiments, an improved technique for dividing resources of base stations among multiple mobile stations has been provided that, among other things, detects measurement reports based on the serving base station and the neighboring base station. As a result, the resources, such as the frequency and timing, are divided with a more holistic view of the usage of these resources. The various teachings are able to choose users with an assignment during a timeslot that ultimately will receive the least interference from the frequencies being transmitted to other users during the timeslot. Thus, a more intelligent frequency and timing assignment technique is provided that maximizes signal strength recieved while minimizing the interference at other currently receiving mobile stations. In other words, these frequency and interference assignments are divided among the mobile stations based not only on the unique radio frequency conditions of the receivers, but also the radio frequency conditions of the interference receivers.

Those skilled in the art will recognize that a wide variety of modifications, altercations, and combinations can be made with respect to the above described embodiments without departing from the spirit and scope of the invention, and that such modifications, altercations, and combinations are to be viewed as being within the ambit of the inventive concept.

We claim:
1. A method comprising:
generating a group having a plurality of overlapping mobile stations, wherein the plurality of overlapping mobile stations are in an area served by a plurality of base stations;

ranking the plurality of overlapping mobile stations based, at least in part, on at least one threshold;

selecting a maximum number of the plurality of overlapping mobile stations having a highest ranking that can be assigned with reserved frequency and timing assignments to provide a plurality of selected overlapping mobile stations;

assigning the plurality of selected overlapping mobile stations using the reserved frequency and timing assignments.

2. The method according to claim 1 further comprising:

assigning remaining overlapping mobile stations that were not the selected overlapping mobile stations using non-reserved frequency and timing assignments.

3. The method according to claim 1 wherein prior to generating a group having a plurality of overlapping mobile stations, the method further comprises:

generating a group having a plurality of non overlapping mobile stations, wherein the plurality of non overlapping mobile stations are in an area served by a single station;

assigning the non-overlapping mobile stations using non-reserved frequency and timing assignments.

4. The method according to claim 1 wherein prior to generating a group having a plurality of overlapping mobile stations, the method further comprises:

receiving measurement reports from the plurality of mobile stations.

5. The method according to claim 1, wherein the at least one threshold is based, at least in part, on power levels of the overlapping mobile stations, type of service needed by the overlapping mobile stations, and aggregated data rates of the mobile stations.

6. The method of claim 1 further comprising:

informing at least one neighboring base station of the reserved frequency and timing assignments.

* * * * *